United States Patent [19]
Allen

[11] 3,723,813
[45] Mar. 27, 1973

[54] ALARM CIRCUIT FOR MONITORING THE PRIMARY WINDING OF A NEUTRALIZING TRANSFORMER AND ITS GROUNDING CONNECTION

[76] Inventor: Gordon Y. R. Allen, 4 Ireland Court, Islington, Ontario, Canada

[22] Filed: Jan. 17, 1972

[21] Appl. No.: 218,108

[52] U.S. Cl. .................317/18 B, 317/27 R, 324/51, 340/256
[51] Int. Cl. .............................................H02h 3/28
[58] Field of Search....317/18 D, 27 R, 18 B; 324/51; 340/256

[56] References Cited
UNITED STATES PATENTS

| 3,641,393 | 2/1972 | Florance et al. | 317/18 D |
| 3,676,737 | 7/1972 | Garzon | 317/18 D |

*Primary Examiner*—James D. Trammell
*Attorney*—Edwin E. Greigg

[57] ABSTRACT

A remote alarm and indicating circuit for the primary of a neutralizing transformer utilizing an oscillator to produce balanced opposing signals in the primary and grounding circuits. These signals also flow through the coils of a differential relay in such a manner that if the ground circuit opens or if there is an appreciable change in its impedance or resistance, on the order of 5 percent or more, the differential relay will operate denoting such an occurrence.

6 Claims, 5 Drawing Figures

Patented March 27, 1973  3,723,813

ALARM CIRCUIT FOR MONITORING THE PRIMARY WINDING OF A NEUTRALIZING TRANSFORMER AND ITS GROUNDING CONNECTOR

A neutralizing transformer for use in a communication circuit is used to provide neutralization for a rise in electric power ground potential and/or longitudinally induced voltages caused by communication lines entering electric power stations or otherwise exposed to the influences of induced voltages due to their proximity to high voltage transmission lines.

In the case where the neutralizing transformer is used to neutralize the effects of power station ground potential rise, one side of the transformer primary is usually connected to the substation grounding mat, and the other side is connected to a remote ground outside the influence of the power station ground by means of a conductor. This conductor is often carried back as far as the telephone central office ground by means of the use of combinations of cable sheath, cable messenger or spaced pairs connected in parallel in the cable.

Under normal operating conditions, it is rare that the power station ground potential rises and so the current through the neutralizing transformer is nil. Rises in ground potential appear usually under fault conditions in the power network and it is under these conditions that the transformer is called upon to operate. The difference in potential exciting the primary induces a voltage in the secondary winding of the transformer.

It is important that the neutralizing transformer circuit be maintained intact since an open circuit anywhere from the substation ground to the remote ground would cause the transformer to be inoperative, thereby allowing extraneous signals to enter the communication system. It is therefore desirable to monitor the operation of the neutralizing transformer primary grounding circuit to ensure its operation when it is needed. An alarm circuit to monitor the primary circuit must not be directly connected to the primary winding because during operation, substantial voltages are developed and these voltages could be hazardous to personnel. It is also desirable to be able to detect a potential open circuit before it occurs.

The circuit described in the following specification not only senses when the primary winding circuit of the neutralizing circuit is open, but under certain circumstances, detects a potentially open circuit by reacting to smaller changes in impedance rather than a completely open circuit, thus giving notice that corrective actions must be taken.

Further, an alarm circuit should be of such a design that it will not add erroneous signals of its own to the communication circuit. Advantageously, the present invention is balanced so that the resultant current due to the alarm circuit within the primary winding circuit of the neutralizing transformer is zero. Thus the secondary sees no effect from the alarm circuit being used.

It is the principal object of this invention to provide a circuit which will monitor the continuity of the primary grounding circuit of a neutralizing transformer and initiate a visible or audible alert signal upon failure of continuity.

Another object of this invention is to provide a monitor circuit to monitor the continuity of the primary winding ground circuit of a neutralizing transformer which will not have a direct electrical connection to the primary of the transformer.

It is a further object of this invention to provide a monitor circuit for the primary winding ground circuit of a neutralizing transformer which will not excite the primary winding or induce voltages in any manner.

A still further object of this invention is to provide a monitor circuit for the primary winding ground circuit of a neutralizing transformer which can be adjusted to correct for seasonal changes in ground mat to ground resistance or other arbitrary changes in the ground circuit such as a change in the number of pairs used without affecting the sensing of a true open circuit.

These and further objects will become clear upon a careful study of the following specification together with the appended drawings and claims.

DESCRIPTION OF THE EMBODIMENTS

Figure 1:
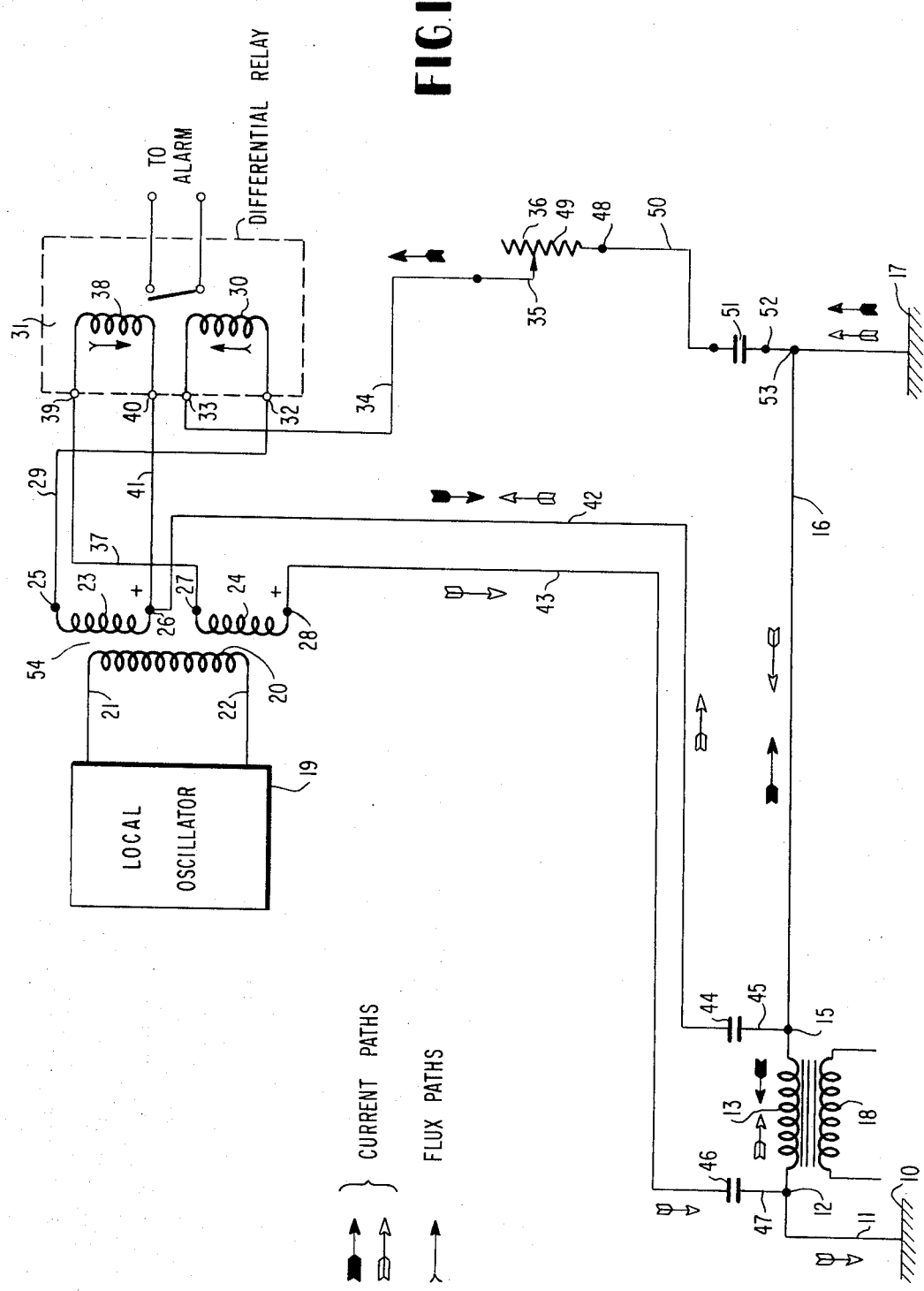
FIG. 1 is a schematic of the circuit showing the primary winding and grounding circuit and the monitor circuit coupled to it.

Referring now to FIG. 1 there is shown substation ground mat 19 which is in intimate contact with the ground. Attached to one side 12 of the primary winding 13 of neutralizing transformer 14 is a grounding cable 11. Attached to the other side of primary winding 13 at point 15 is a long grounding cable 16 which extends to remote ground 17. Ground 17 is sufficiently remote from ground mat 10 so that it is outside the influence of ground potential changes at grounding mat 10. Secondary winding 18 is shown for illustrative purposes and it is connected in a conventional manner to a utilization device (not shown) which is well known to the art.

Turning to the uppermost portion of FIG. 1, one observes local oscillator 19 connected to output transformer primary winding 20 by wires 21 and 22. Output transformer secondary comprises two identical windings 23 and 24. Winding 23 is made identical to winding 24 and wound so that the voltage developed across winding 23 from one end connection point 25 to the other point 26 is equal and has the same polarity as that of secondary winding 24 between end connections 27 and 28. Thus, for example, the lower ends of each winding will be positive at the same moment and/or vice versa.

Point 25 of secondary winding 23 is connected by wire 29 to one end of coil 30 of differential relay means 31 at point 32. The opposite end 33 of coil 30 is connected by wire 34 to the slider 35 of potentiometer 36 for purposes to be described later.

In a like manner the upper end point 27 of secondary winding 24 is connected by wire 37 to one end point 39 of the second coil 38 of differential relay means 31 so that the polarity and therefore the flux of coil 38 is opposite to that in coil 30 when the voltages in secondary windings 23 and 24 are the same.

The opposite end of coil 38, point 40, is connected by wire 41 to the opposite end of secondary winding 23 at point 26. From point 26, a wire 42 is connected to one side of capacitor 44, the opposite side of which is connected by wire 45 to one end of primary transformer winding 13 at point 15. The other end of secondary transformer winding 24, point 28, is connected by wire 43 to one side of capacitor 46, the opposite side of which is connected by wire 47 to the opposite end point 12 of primary winding 13.

Turning to the right hand portion of FIG. 1, one observes that the lower end point 48 of potentiometer winding 49 is connected by wire 50 to one side of capacitor 51, the opposite side being connected by wire 52 to point 53 in close proximity to remote ground mat 17.

One skilled in the art will realize from this construction that capacitors 44, 46 and 51 are isolating capacitors which have a very high impedance at 60 Hz, the frequency of the current found normally in the neutralizing transformer primary, thus they represent an open circuit at this frequency. The frequency of the local oscillator means 19 must be chosen, however, so that impedance of said capacitors is very low at local oscillator frequency, so that said capacitors represent essentially a short circuit at the local oscillator frequency.

Figure 2:
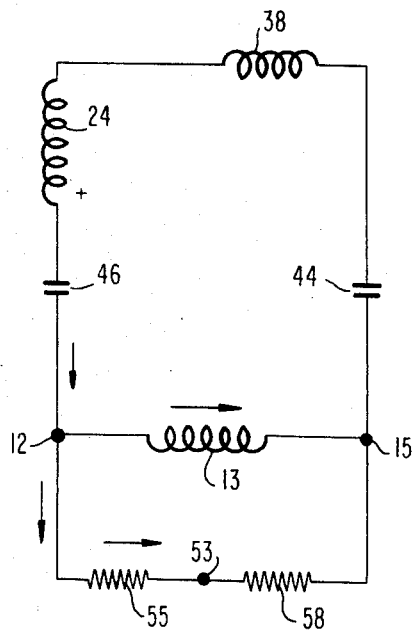
FIG. 2 shows an equivalent circuit of one-half of the alarm circuit.

Referring now to FIG. 2, there is shown the equivalent circuit loop driven by secondary winding 24 of output transformer 54 in which resistances 55 and 58 represent the total ground and cable resistance between grounding mat 10 and remote grounding mat 17. Cable 16 is represented by a resistor 58 in series with ground resistance 55, the resistors being connected between the ends of the primary winding points 12 and 15.

As will be obvious to those skilled in the art, the current produced by the voltage changes in secondary winding 24 flows through capacitor 46 and divides at point 12 into two parallel paths between points 12 and 15, one path through the primary transformer winding 13 and the second path through resistance 55, the cable 16 represented by resistor 58 in this diagram. The value of the current through each path is inversely proportional to the respective path impedance at the output frequency of local oscillator 19. The arrows represent the direction of current flow when the lower end of secondary winding 24 swings positive. The current from point 15 through capacitor 44 and differential relay coil 38 back to secondary winding 24 is again the sum of the divided currents.

Figure 3:
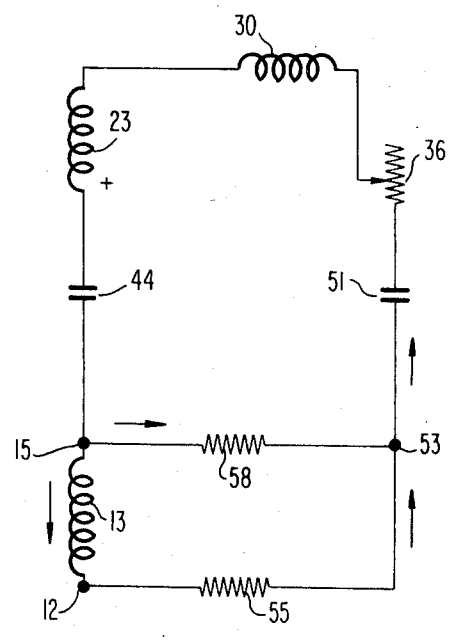
FIG. 3 shows an equivalent circuit of the second half of the alarm circuit.

In a like manner, referring to FIG. 3, there is shown an equivalent circuit loop driven by secondary winding 23 of output transformer 55, in which resistance 58 represents the cable resistance of remote cable 16, 55 again represents the total ground resistance and inductor 13 is the primary winding of the neutralizing transformer.

The current produced by the voltage changes in secondary winding 23 flows through capacitor 44 and divides at point 12 into two parallel paths between points 15 and 53, one path through the cable resistance 58 and the second path through the primary transformer winding 13 and resistance 55 in series with it. The current again divides in a manner inversely proportional to the impedance of each path at the output frequency of oscillator 19. The arrows represent the direction of current flow when the lower end of secondary winding 23 swings positive. Since secondary windings 23 and 24 of the local oscillator output transformer 54 have been wound so that their voltages and current are the same and are in the same direction or are in phase, the current flow depicted in FIGS. 2 and 3 is also in phase.

It will be observed, however, by close comparison between FIGS. 2 and 3, that the direction of current flow in the primary winding 13 of the neutralizing transformer due to secondary winding 24 is towards point 15, while that due to the secondary winding 23 is away from point 15, and since the currents in secondary windings 23 and 24 are, as stated previously, always in phase with each other, these two currents buck and tend to cancel out, thus inducing no effect into the neutralizing transformer itself. By adjusting potentiometer 36, the bucking current in primary winding 13 due to secondary winding 23 can be adjusted to precisely cancel the current in the primary winding 13 due to secondary winding 24.

Since the impedance of primary winding 13 in FIG. 2 is low and the impedance of the cable 16 shown as resistor 58 in FIG. 3 is also low, the currents through differential relay coils 38 and 30 can easily be adjusted to be approximately equal; therefore, the relay is not activated. This then represents the balanced condition in the primary ground circuit intact. Should the primary ground circuit however open, the equivalent circuits change as shown in FIGS. 4 and 5.

Figure 4:
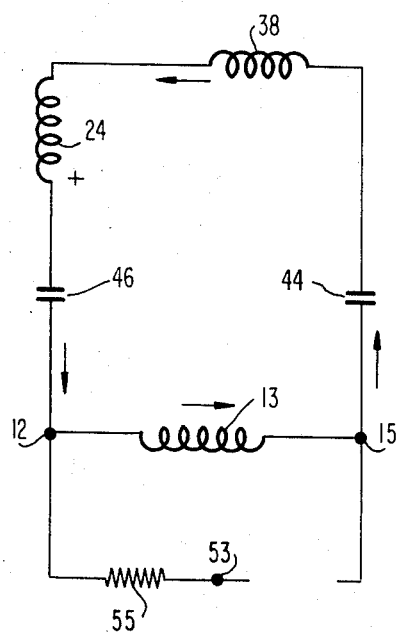
FIG. 4 shows an equivalent circuit as in FIG. 2 but with the primary winding ground circuit open.

Referring now to FIG. 4, the same circuit is shown as in FIG. 2, but with cable 16 open; therefore, resistance 58 has been removed. Since the cable resistance 58 is in series with the ground resistance 55, and the ground resistance 55 is high compared to the primary winding impedance of winding 13, the current in the loop and therefore in differential relay coil 38 does not appreciably change. The purpose of this will be evident.

Figure 5:
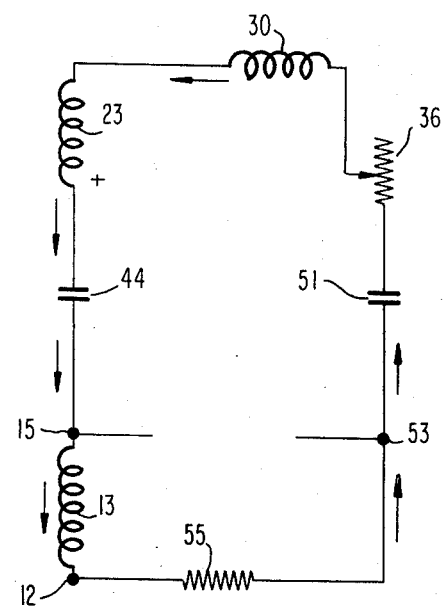
FIG. 5 shows an equivalent circuit as in FIG. 3 but with the primary winding ground circuit open.

Referring now to FIG. 5, there is shown the same equivalent circuit as in FIG. 3, but again with the cable 16 open and therefore resistance 58 removed. Since ground resistance 55 is relatively high and the primary current path, i.e. the cable resistance 58 removed, there is an immediate drop in the current in the loop, and therefore in differential relay coil 30, causing differential relay 31 to activate. Connected to the differential relay contacts may be an audible alarm or a visual alarm system such as a warning light, not depicted in the drawings because it is so well known to the art.

It should be obvious to those skilled in the art that any appreciable change in the ground impedance 55 will also cause imbalance in the differential relay and trip the alarm.

It should also be obvious that any appreciable change in impedance in any element around the circuit loop points 12, 53, 15 and 12 will unbalance the currents through the upper portion of one loop and cause the relay to trip, thus a minor fault in cable 16 or a poor or corroded connection would cause the alarm to trip warning of impending trouble.

The circuit described here is but one species of this balanced alarm system and it should be clear that changes can be made without departing from the basic novelty and scope of this invention, for example, a differential amplifier and its associated components may be used in place of the differential relay.

That which is claimed is:

1. A monitor circuit for monitoring the primary winding ground circuit of a neutralizing transformer comprising a differential relay having a first and a second winding and means operable upon an unbalance in current flowing through said first and second windings. A local oscillator having a first and a second output circuit, means for connecting said first output circuit in series with said first winding and said primary winding and said second output circuit in series with said second winding and said primary winding so as to produce a substantially equal and opposite current flow in said first and said second windings and an unbalance in the current flow in said first and said second windings upon a change in the impedance of the primary winding ground circuit of the neutralizing transformer.

2. A monitor circuit as set forth in claim 1, wherein said ground circuit includes a local ground connected to one side of the primary winding and a remote ground connected to the other side of the primary winding, said remote ground being located outside the influence of the local ground.

3. A monitor circuit as set forth in claim 2, wherein said means for connecting said first and said second windings includes separate circuits including a balancing potentiometer connected in series with one of said first and second windings.

4. A remote monitor circuit for monitoring the primary winding ground circuit of a substation neutralizing transformer comprising a local substation ground circuit for said primary winding and a remote ground circuit for said primary winding, said remote ground circuit having a ground established outside the influence of the substation ground, a differential relay having a first and a second winding, first means connecting said first winding in series with the neutralizing transformer primary winding, second means connecting said second winding in series with the neutralizing transformer primary winding, means for applying to said first and second winding a current flow to produce opposing forces, said relay including a switch adapted to be operated from a first position corresponding to substantially equal and opposite opposing forces to a second position corresponding to an unbalance of the opposing forces resulting from a change in the impedance of the primary winding ground circuit of the neutralizing transformer.

5. A remote monitor circuit as set forth in claim 4, wherein said differential relay is remote from said substation.

6. A remote monitor circuit as set forth in claim 4, wherein said remote ground circuit comprises a cable connected between one end of the primary winding and a remote ground point, said local ground circuit comprising a direct connection to the substation ground from the other end of the primary winding, said cable being connected in series with the ground circuit of said primary winding by said first means and in parallel with the ground circuit of said primary winding by said second means.

* * * * *